US012496905B2

(12) United States Patent
Batarseh et al.

(10) Patent No.: US 12,496,905 B2
(45) Date of Patent: Dec. 16, 2025

(54) VEHICLE DISPLAY

(71) Applicant: Ford Global Technologies, LLC, Dearborn, MI (US)

(72) Inventors: Rami Batarseh, Sterling Heights, MI (US); Mark Larry, Macomb, MI (US); Biaohe Guo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 18/585,604

(22) Filed: Feb. 23, 2024

(65) Prior Publication Data

US 2025/0269723 A1   Aug. 28, 2025

(51) Int. Cl.
*H04N 7/18* (2006.01)
*B60K 35/21* (2024.01)
*B60K 35/22* (2024.01)
*B60K 35/65* (2024.01)
*B60J 1/02* (2006.01)

(52) U.S. Cl.
CPC ............ *B60K 35/22* (2024.01); *B60K 35/213* (2024.01); *B60K 35/656* (2024.01); *B60J 1/02* (2013.01)

(58) Field of Classification Search
CPC ........ H04N 7/18; B60K 35/22; B60K 35/656; B60K 35/213; B60J 1/02
USPC ........................................................ 348/148
See application file for complete search history.

(56) References Cited

U.S. PATENT DOCUMENTS

| | | | |
|---|---|---|---|
| 2016/0221611 A1* | 8/2016 | Wolf | B62D 29/002 |
| 2017/0212633 A1 | 7/2017 | You et al. | |
| 2018/0128044 A1* | 5/2018 | Ochiai | G02F 1/137 |
| 2018/0204538 A1* | 7/2018 | Reckamp | B60K 35/22 |
| 2022/0283432 A1 | 9/2022 | Richards | |

* cited by examiner

*Primary Examiner* — Trang U Tran
(74) *Attorney, Agent, or Firm* — Vichit Chea; Price Heneveld LLP

(57) ABSTRACT

A vehicle with a body defining a passenger compartment and having first and second support pillars on opposite sides on a front side of the passenger compartment. The vehicle has a windshield connected to the body and located between the first and second support pillars, the windshield having a windshield curvature. The vehicle has an instrument panel extending between the first and second support pillars. The vehicle has an electronic display substantially extending between the first and second support pillars and proximate to a lower portion of the windshield. The electronic display has a display curvature that is substantially similar to the windshield curvature.

13 Claims, 5 Drawing Sheets

VEHICLE DISPLAY

FIELD OF THE DISCLOSURE

The present disclosure generally relates to a display arrangement on a vehicle, and more particularly relates to an electronic display installed proximate to the windshield on a motor vehicle.

BACKGROUND OF THE DISCLOSURE

Motor vehicles typically include electronic display devices for displaying information. For example, displays may be mounted proximate to the vehicle windshield, such as a Head-Up Display, or a display screen on the instrument panel or dashboard. It would be desirable to provide for other display arrangements for use on a motor vehicle.

SUMMARY OF THE DISCLOSURE

According to a first aspect of the present disclosure, a vehicle having a body defining a passenger compartment and having first and second support pillars on opposite sides on a front side of the passenger compartment, a windshield connected to the body and located between the first and second support pillars, the windshield having a configuration with a windshield curvature, a panel generally extending between the first and second support pillars below the windshield, and an electronic display substantially extending between the first and second support pillars and proximate to a lower portion of the windshield, wherein the electronic display has a display curvature that is substantially similar to the windshield curvature.

Embodiments of the first aspect of the present disclosure can include any one or a combination of the following features:

- the panel comprises an instrument panel;
- the mechanical support structure comprises a male member on one surface of the electronic display and the instrument panel configured to be received within a female receptacle on the other surface of the electronic display and the instrument panel;
- the electronic display is located vehicle rearward of the lower portion of the windshield;
- the mechanical support structure is configured to connect to an interior surface of the windshield;
- the windshield has the windshield curvature along the height of the windshield that substantially matches the display curvature along a height of the electronic display;
- the windshield curvature of the windshield along a width substantially matches the display curvature of the electronic display along the width;
- the electronic display is configurable as a split-screen display;
- the electronic display is configurable to have transparent and non-transparent portions;
- a mechanical support structure configured to connect the electronic display to the instrument panel; and
- the first and second support pillars extend vertically on opposite lateral sides of the body and are connected to a roof of the vehicle.

According to a second aspect of the present disclosure, a vehicle having a body defining a passenger compartment and having first and second support pillars, the windshield having a windshield curvature, a windshield connected to the body and located between the first and second support pillars, an instrument panel generally extending between the first and second support pillars below the windshield, an electronic display substantially extending between the first and second support pillars and proximate to a lower portion of the windshield, wherein the display has a display curvature that substantially matches the windshield curvature, and a support structure configured to connect the electronic display to the instrument panel.

Embodiments of the second aspect of the present disclosure can include any one or a combination of the following features:

- the mechanical support structure comprises a male member on one surface of the electronic display and the instrument panel configured to be received within a female receptacle on the other surface of the electronic display and the instrument panel;
- the male member is formed on a lower surface of the electronic display and the female receptor is formed on a top surface of the instrument panel;
- the windshield has the windshield curvature along the height of the windshield that substantially matches the display curvature along a height of the display;
- the windshield curvature of the windshield along a width substantially matches the display curvature of the electronic display along the width;
- the electronic display is configurable as a split-screen display;
- the electronic display is configurable to have transparent and non-transparent portions;
- the electronic display is located vehicle rearward of the lower portion of the windshield; and
- the first and second support pillars extend vertically on opposite lateral sides of the body and are connected to a roof of the vehicle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
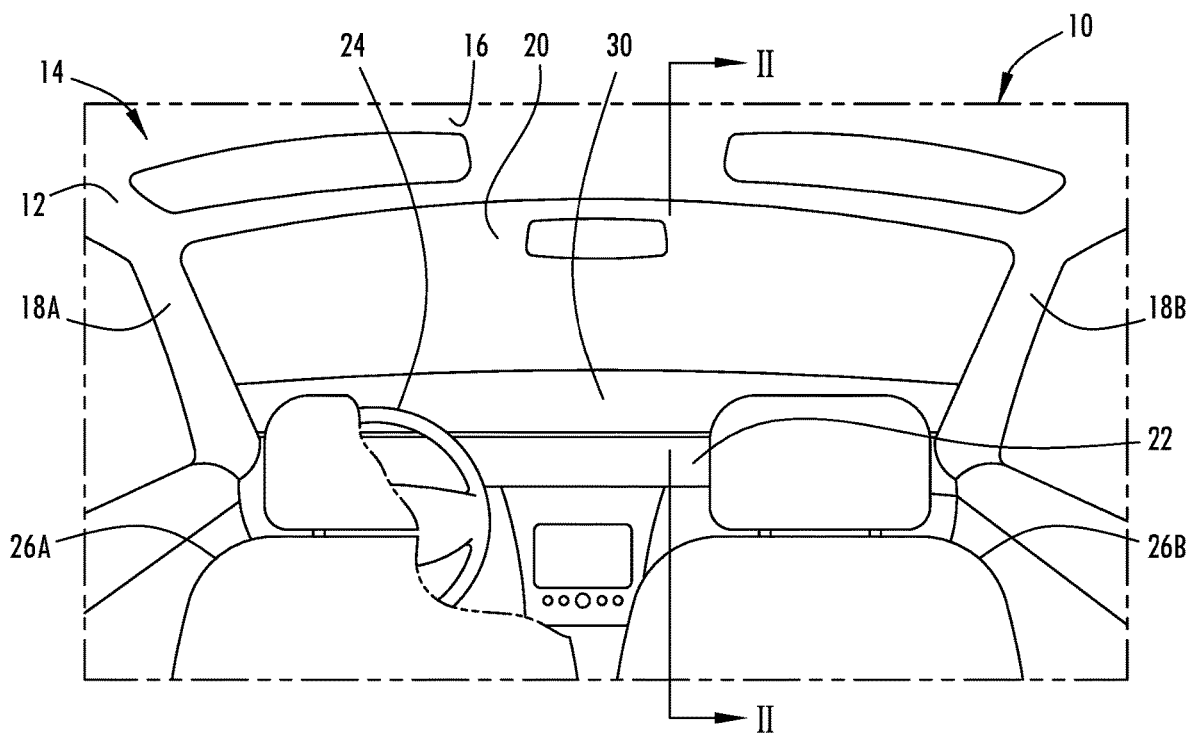
FIG. 1 is a front view of the forward portion of an interior cabin of a motor vehicle having an electronic display mounted proximate to the vehicle windshield, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having an electronic display. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10, such as a wheeled motor vehicle, is generally illustrated having a vehicle body 12 defining a cabin interior also referred to as a passenger compartment 14. The passenger compartment 14 generally includes passenger seating, including a front row of seating having a driver seat 26A and a passenger seat 26B. The motor vehicle 10 may have one or more rear rows of seating. Located forward of the driver seat 26A is a steering wheel 24. A trim panel in the form of a dashboard, also referred to as an instrument panel 22, extends forward of the first row of seating and forward of the steering wheel 24.

The body 12 includes a windshield 20 generally extending across the front end of the passenger compartment 14. The windshield 20 generally extends above and forward of the instrument panel 22. The body 12 also includes a roof 16 along the top side and left and right side support pillars 18A and 18B shown located on the front lateral left and right sides of the vehicle body 12. The support pillars 18A and 18B may extend from an underlying frame and connect to the roof 16 at the top end. The windshield 20 thereby extends between the left and right support pillars 18A and 18B on the left and right sides and the instrument panel 22 and roof 16 on the bottom and top sides.

The motor vehicle 10 includes an electronic display 30 shown substantially extending between the first and second support pillars 18A and 18B and proximate to a lower portion of the windshield 20 inside the passenger compartment 14. The electronic display 30 is vehicle rearward of the windshield 20 and therefore located in the passenger compartment 14. The electronic display 20 is positioned proximate the lower portion of the windshield 20 generally supported on top of the instrument panel 22 and extending substantially the full length between the first and second support pillars 18A and 18B. As such, the electronic display 30 is viewable by a driver and passenger looking forward in the motor vehicle 10 and viewing the electronic display 20 proximate the lower portion of the windshield 20.

Figure 2:
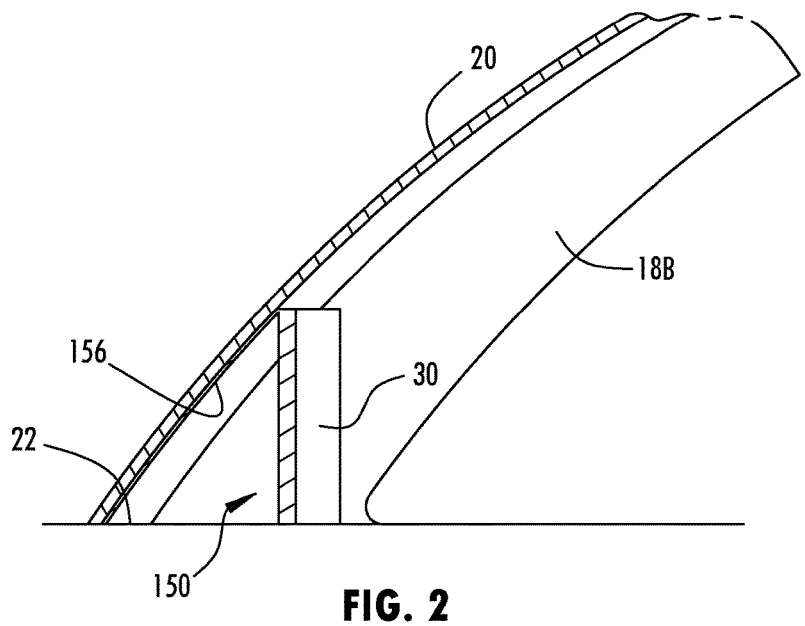
FIG. 2 is a side view of the vehicle windshield and the electronic display mounted on top of an instrument panel with a support structure, according to one example.

The electronic display 30 may be connected to the support pillars 18A and 18B on opposite lateral ends via fasteners and may further be connected to the instrument panel 22 and/or windshield 20. The electronic display 30 may be mounted on top of the instrument panel 22 and held in place with a mechanical support structure 150 as shown in FIG. 2 in one example. In another example, the display may extend above the instrument panel 22 via a gap. The mechanical support structure 150 may include an angled support wall 156 engaging the inner surface on the lower portion of the windshield 20 and the top surface of the instrument panel 22. The angled support wall 156 is on the vehicle forward side of the electronic display 30. The angled support wall 156 may be curved to substantially match the curvature of the lower portion of the windshield 20 and may be connected to the instrument panel 22 and/or windshield 20 with fasteners and/or adhesive. In one embodiment, the width of the display 30 may be less than the distance between the first and second support pillars 18A and 18B.

The windshield 20 has a sloped contour with a windshield curvature along the width extending between the first and second support pillars 18A and 18B and along the height extending from the instrument panel 22 to the roof 16. The electronic display 30 likewise has a sloped contour with a display curvature along the width and the height of the electronic display 30. The display curvature substantially matches the windshield curvature. This matching curvature can be seen in FIG. 4 in which the windshield 20 curves from the bottom end on the top of the instrument panel 22 to the top end at the roof 16 and also curves along the width extending between the first and second support pillars 18A and 18B. The electronic display 30 likewise has a display curvature extending from the bottom end on the instrument panel 22 up until the proximate contact with the windshield 20 at the upper end and a display curvature substantially matching the windshield curvature extending along the width from the first support pillar 18A to the second support pillar 18B. As such, the windshield curvature of the windshield 20 substantially aligns with the display curvature of the electronic display 30.

The electronic display 30 may be configured as a rigid display formed in the shape of the curved configuration. The electronic display 30 may be formed as a flexible display that may be flexed to assume the shape of the curved configuration when mounted onto the vehicle 10. The electronic display 30 may include any of a number of electronic displays to display content such as the examples of displays illustrated in FIGS. 3A-3C.

Figure 3A:
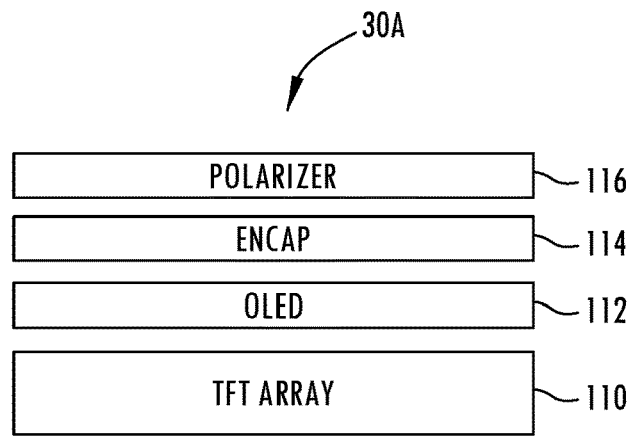
FIG. 3A is a schematic view of the layers of the electronic display, according to a first example.

The electronic display 30 may be configured as an organic light emitting diode (OLED) display 30A, according to one example shown in FIG. 3A. The OLED display 30A may be a flexible display having a TFT array 110 with an OLED layer 112 formed on top thereof. An encapsulation layer 114 may be formed on top of the OLED layer 112. Finally, a polarizer 116 may be fabricated on top of the encapsulation layer 114.

Figure 3B:
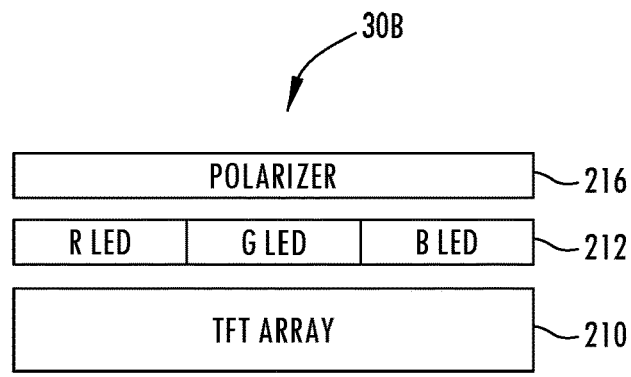
FIG. 3B is a schematic view of the layers of the electronic display, according to a second example.

The electronic display 30 may be configured as a micro light emitting diode (LED) display 30B as shown in the example in FIG. 3B. The micro LED display 30B likewise has a TFT array 210. Disposed or layered on top of the TFT array 210 is an array of Red-Green-Blue (RGB) LEDs 212. A polarizer layer 216 is formed on top of the LED layer 212.

Figure 3C:
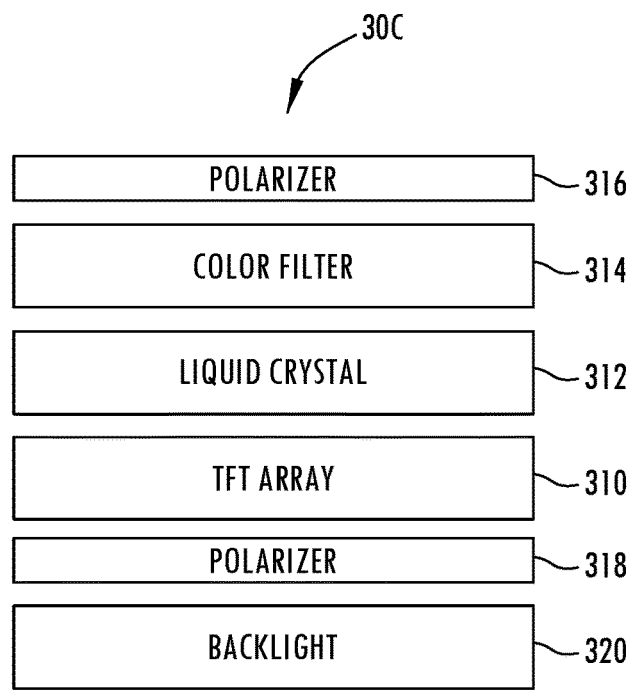
FIG. 3C is a schematic view of the layers of the electronic display, according to a third example.

The electronic display 30 may be configured as a liquid crystal display (LCD) 30C as shown in FIG. 3C, according to a further example. The liquid crystal display 30C employs a backlight layer 320 and a polarizer layer 318 disposed on top thereof and below a TFT array 310. A liquid crystal layer 312 is disposed on top of the TFT array 310. A color filter 314 is layered on top of the liquid crystal layer 312. Finally, a polarizer 316 is shown layered on top of the color filter 314. The liquid crystal display 30C may employ a heat sink design for dissipating heat and generally may be a more rigid type of display compared to the other examples.

Figure 4:
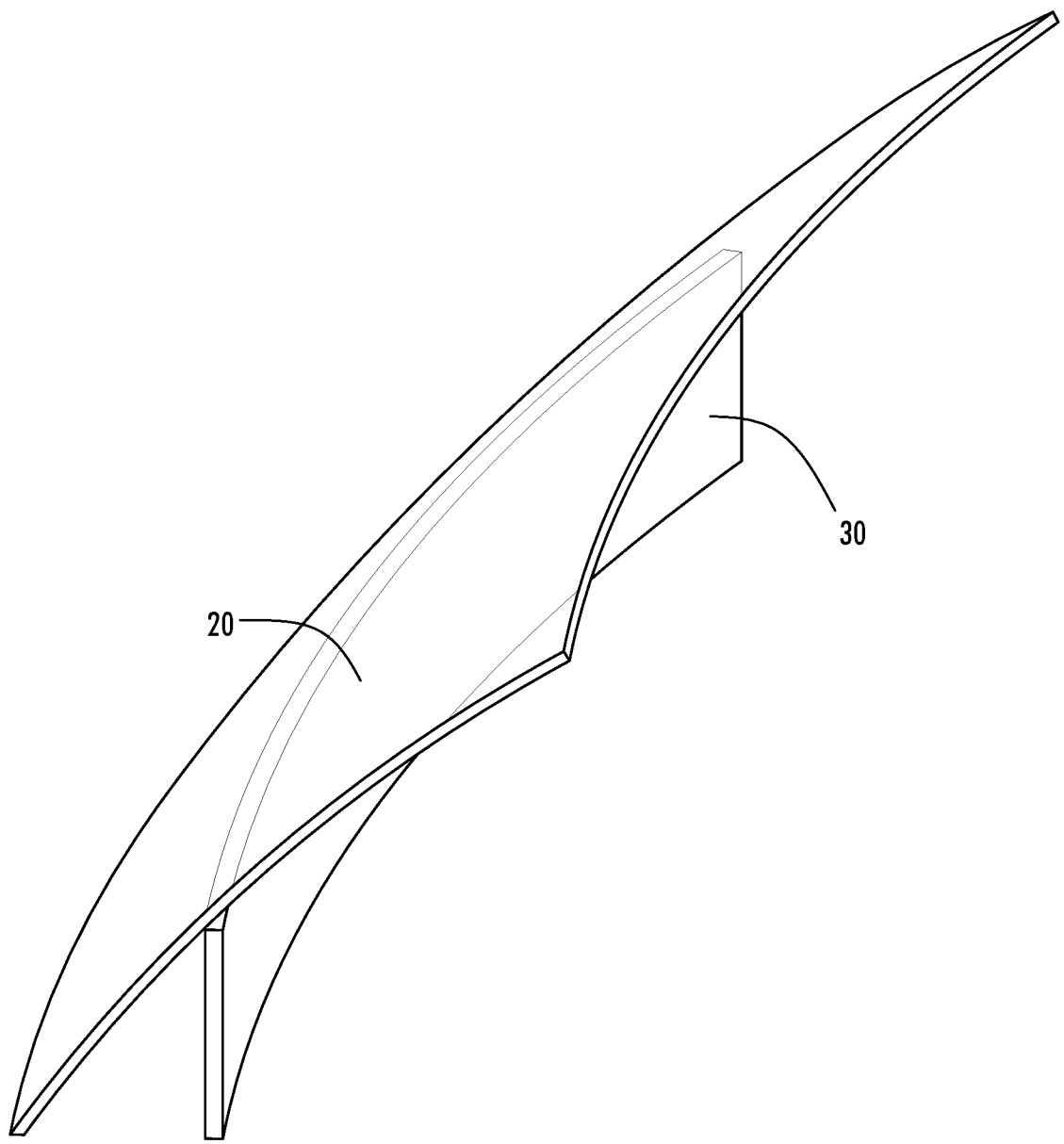
FIG. 4 is a side perspective view of the windshield and the electronic display located on the cabin interior side of the windshield.

Referring to FIG. 4, the electronic display 30 is generally illustrated having a configuration with a display curvature along the height or slope and the width of the motor vehicle 10. Specifically, the electronic display 30 has a sloped curvature extending along the height that curves to match the sloped windshield of the windshield 20 extending between the lateral sides and along the height of the windshield 20.

Figure 5:
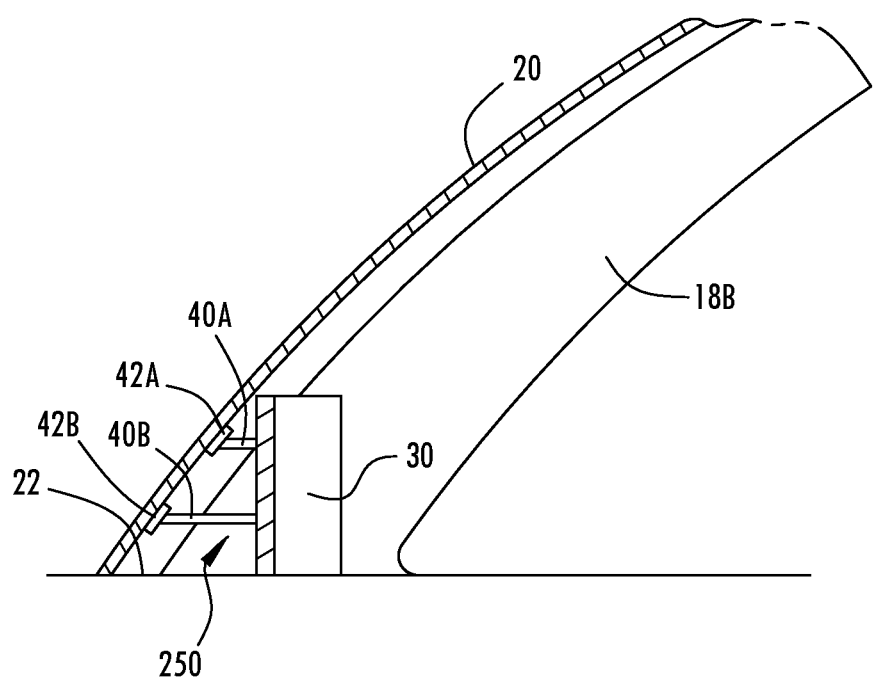
FIG. 5 is a side view of the windshield and a support structure for mounting the electronic display to the windshield, according to another example.

Referring to FIG. 5, one example of a mechanical support structure 250 for mounting the electronic display 30 in the motor vehicle 10 is illustrated. In this example, the electronic display 30 is positioned supported on top of the top surface of the instrument panel 22 in close proximity and vehicle rearward of the windshield 20 along the lower portion thereof. The electronic display 30 is connected to the interior side of the windshield 20 by the mechanical support structure 250 having upper and lower support arms 40A and 40B. The upper support arm 40A is connected to a first connector 42 on the inside surface of the windshield 20. Likewise, the lower support arm 40B is connected to a second connector 42B on the interior surface of the windshield 20. Each of the first and second connectors 42A and 42B may be connected to the interior side of the windshield 20 via an adhesive, for example. It should be appreciated that more than two support arms may be employed. As such, the electronic display 30 may be supported by the windshield 20 and the instrument panel 22 on the bottom side thereof.

Figure 6:
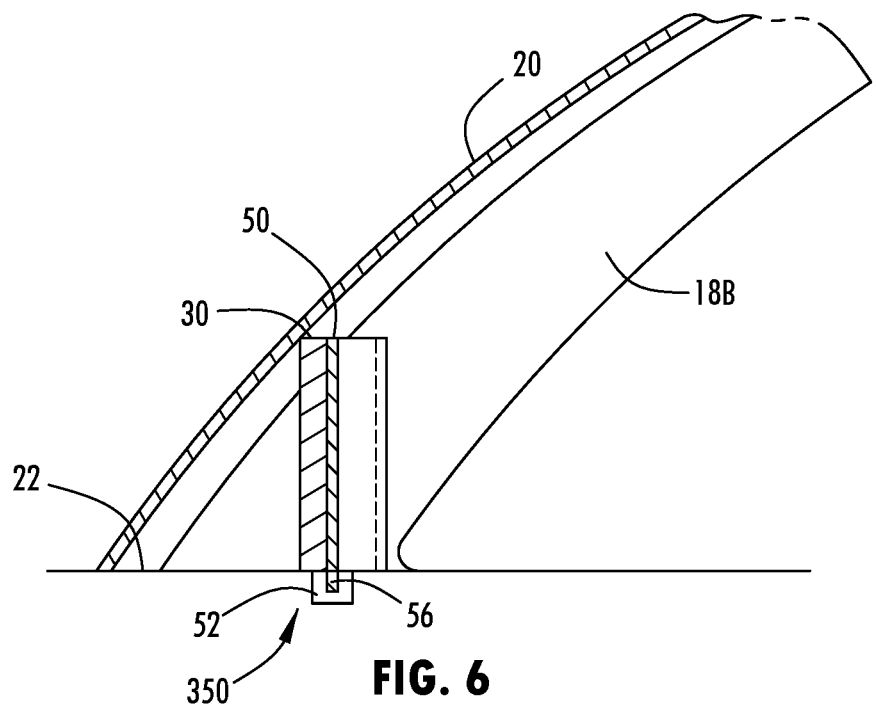
FIG. 6 is a side view of the windshield and the electronic display having a support structure, according to a further example.

Referring to FIG. 6, the electronic display 30 is shown connected to the top surface of the instrument panel 20 by using a mechanical support structure 350 that includes on the front side a vertical male member 50 such as a cover glass or plastic lens having a rib or series of posts having an extended portion 56 extending downward on the bottom side of the electronic display 30. The extended portion 56 of the male member 50 fits within a female receptacle 52 such as a slot or channel formed in the upper surface of the instrument panel 22 extending widthwise between the first and second support pillars 18A and 18B. As such, the lower portion of the post serves as a male member 50 extended within the female receptacle 52. The male member 50 may be fastened or adhered to the female receptacle 52. It should be appreciated that the mechanical support structure shown in FIG. 6 may have the male member 50 formed in one of the electronic display 30 and the instrument panel 20, and the female receptacle 52 formed the other of the electronic display 30 and the instrument panel 20 such that the male member 50 and female receptacle 52 could be switched to be located on either component, according to another example.

Figure 7:
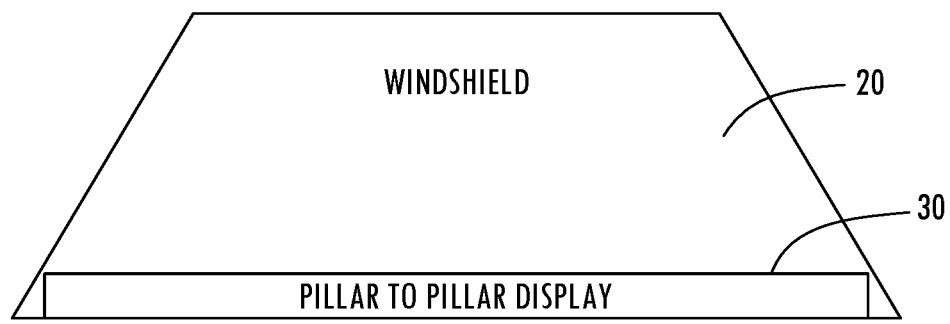
FIG. 7 is a front view of the windshield and the electronic display configured in a first operating mode.
Figure 8:
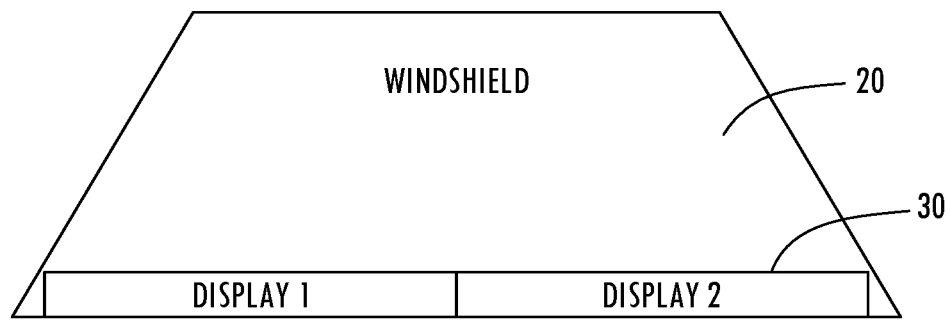
FIG. 8 is a front view of the windshield and the electronic display configured in a split display function, according to a second operating mode.
Figure 9:
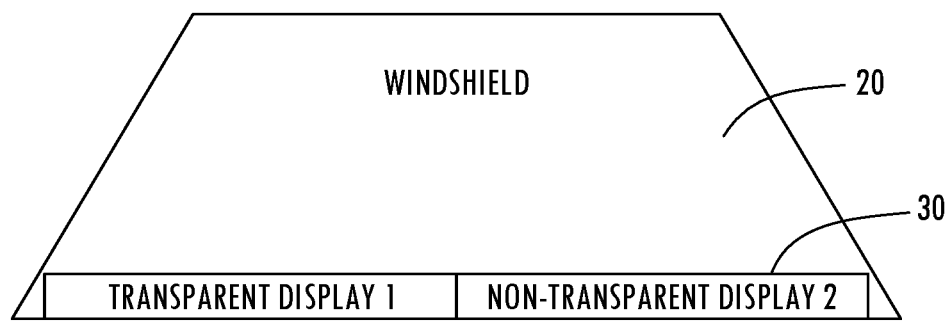
FIG. 9 is a front view of the windshield and the electronic display configured with transparent and non-transparent portions, according to a third operating mode.

Referring to FIGS. 7-9, various examples of the electronic display 30 are illustrated configurable in different operating modes. In FIG. 7, the electronic display 30 is shown configured to operate in a pillar-to-pillar display operating mode as a single display screen. In this mode, content including information such as text, video, icons, and other characters may be displayed across the entire length of the electronic display 30.

The electronic display 30 may also be configured to operate in a split screen display mode, as seen in FIG. 8. In this mode, the electronic display 30 may include a first display screen region as shown on the left half of the electronic display 30 and a second display screen region as shown on the right half of the electronic display. As such, different data may be displayed on each of the two split screen regions.

Referring to FIG. 9, the electronic display 30 may be configured to operate to be split into a transparent display region and a non-transparent display region. The transparent display region is shown on the left side of the electronic display 30, and the non-transparent display region is shown on the right side of the electronic display 30. As such, a viewer located within the motor vehicle 10 may be presented with a transparent viewing area to look through the electronic display 30 and view the lower portion of the windshield 22 in the transparent portion but not in the non-transparent portion. The electronic display 30 may be configured to operate with more than one transparent display and more than one non-transparent regions.

Accordingly, the motor vehicle 10 advantageously employs an electronic display 30, substantially extending between first and second support pillars 18A and 18B in the motor vehicle 10 proximate to a lower portion of the windshield 20 to provide an easy to view display. The electronic display 30 may be curved along the height and width that substantially matches the curvature of the windshield 20. Additionally, the electronic display 30 may advantageously be mounted on top of the instrument panel 22 and may be connected to the instrument panel 22 via a mechanical support structure.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a body defining a passenger compartment and having first and second support pillars on opposite sides on a front side of the passenger compartment;
a windshield connected to the body and located between the first and second support pillars, the windshield having a configuration with a windshield curvature;
a panel generally extending between the first and second support pillars below the windshield, wherein the panel comprises an instrument panel;
an electronic display substantially extending between the first and second support pillars and proximate to a lower portion of the windshield, wherein the electronic display has a display curvature that is substantially similar to the windshield curvature, wherein the windshield has the windshield curvature along the height of the windshield that substantially matches the display curvature along a height of the electronic display, wherein the windshield curvature of the windshield along a width substantially matches the display curvature of the electronic display along the width; and
a mechanical support structure having a male member on one surface of the electronic display and the instrument panel configured to be received within a female receptacle on the other surface of the electronic display and the instrument panel.

2. The vehicle of claim 1, wherein the electronic display is located vehicle rearward of the lower portion of the windshield.

3. The vehicle of claim 1, further comprising a mechanical support structure is configured to connect to an interior surface of the windshield.

4. The vehicle of claim 1, wherein the electronic display is configurable as a split-screen display.

5. The vehicle of claim 1, wherein the electronic display has transparent and non-transparent portions.

6. The vehicle of claim 1, further comprising the mechanical support structure configured to connect the electronic display to the instrument panel.

7. The vehicle of claim 1, wherein the first and second support pillars extend vertically on opposite lateral sides of the body and are connected to a roof of the vehicle.

8. A vehicle comprising:
a body defining a passenger compartment and having first and second support pillars;
a windshield connected to the body and located between the first and second support pillars, the windshield having a windshield curvature;
an instrument panel generally extending between the first and second support pillars below the windshield;
an electronic display substantially extending between the first and second support pillars and proximate to a lower portion of the windshield, wherein the display has a display curvature that substantially matches the windshield curvature, wherein the windshield has the windshield curvature along the height of the windshield that substantially matches the display curvature along a height of the display, wherein the windshield curvature of the windshield along a width substantially matches the display curvature of the electronic display along the width; and
a support structure configured to connect the electronic display to the instrument panel, wherein the support structure comprises a male member on one surface of the electronic display and the instrument panel configured to be received within a female receptacle on the other surface of the electronic display and the instrument panel.

9. The vehicle of claim 8, wherein the curvature of the windshield substantially aligns to the curvature of the display.

10. The vehicle of claim 8, wherein the electronic display is configurable as a split-screen display.

11. The vehicle of claim 8, wherein the electronic display is configurable to have transparent and non-transparent portions.

12. The vehicle of claim 8, wherein the electronic display is located vehicle rearward of the lower portion of the windshield.

13. The vehicle of claim 8, wherein the first and second support pillars extend vertically on opposite lateral sides of the body and are connected to a roof of the vehicle.

* * * * *